Nov. 14, 1933.   I. M. HAAG   1,935,557
ILLUMINATED DISPLAY DEVICE
Filed Nov. 22, 1932   3 Sheets-Sheet 1
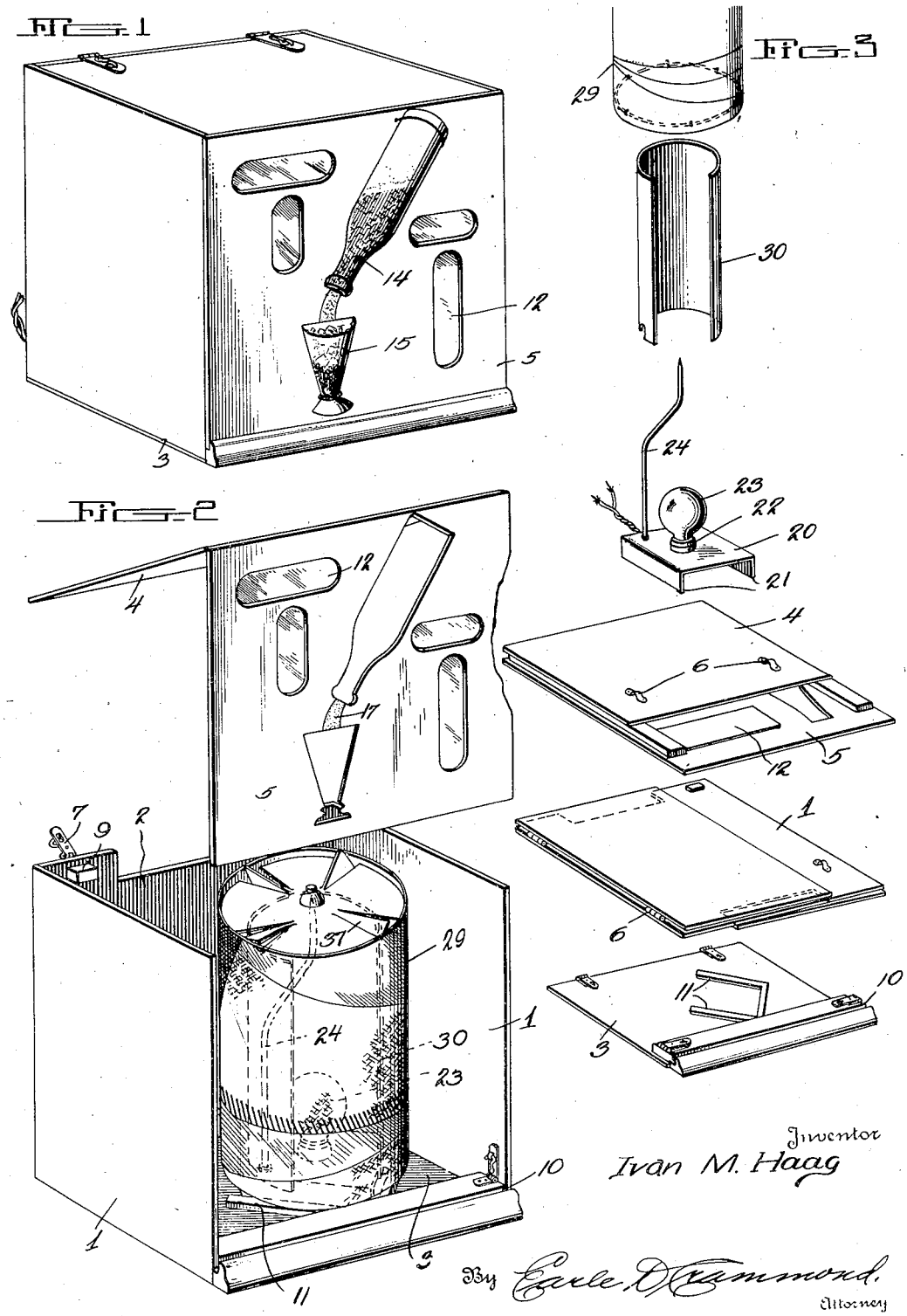
Inventor
Ivan M. Haag Nov. 14, 1933.   I. M. HAAG   1,935,557
ILLUMINATED DISPLAY DEVICE
Filed Nov. 22, 1932    3 Sheets-Sheet 2
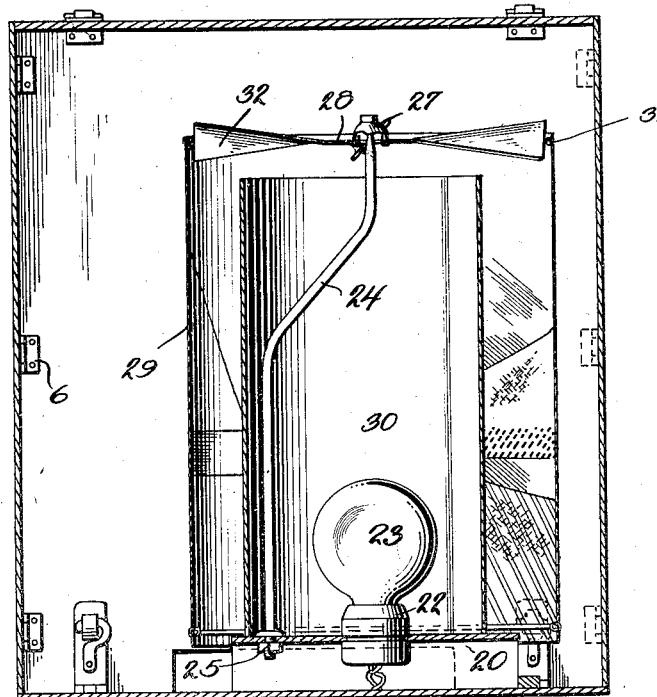
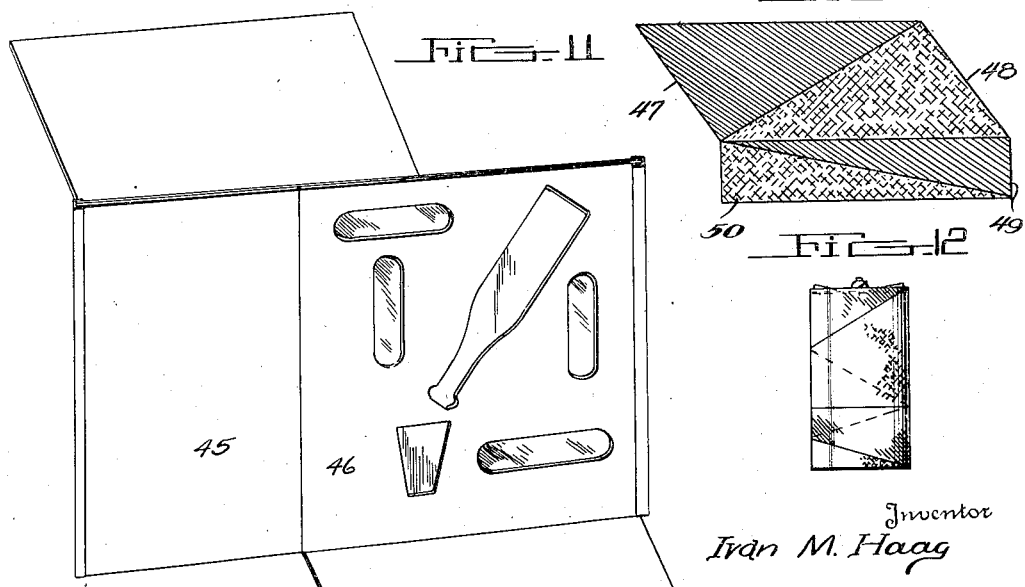
Inventor
Ivan M. Haag
By Earle A. Hammond
Attorney Nov. 14, 1933.  I. M. HAAG  1,935,557
ILLUMINATED DISPLAY DEVICE
Filed Nov. 22, 1932   3 Sheets-Sheet 3
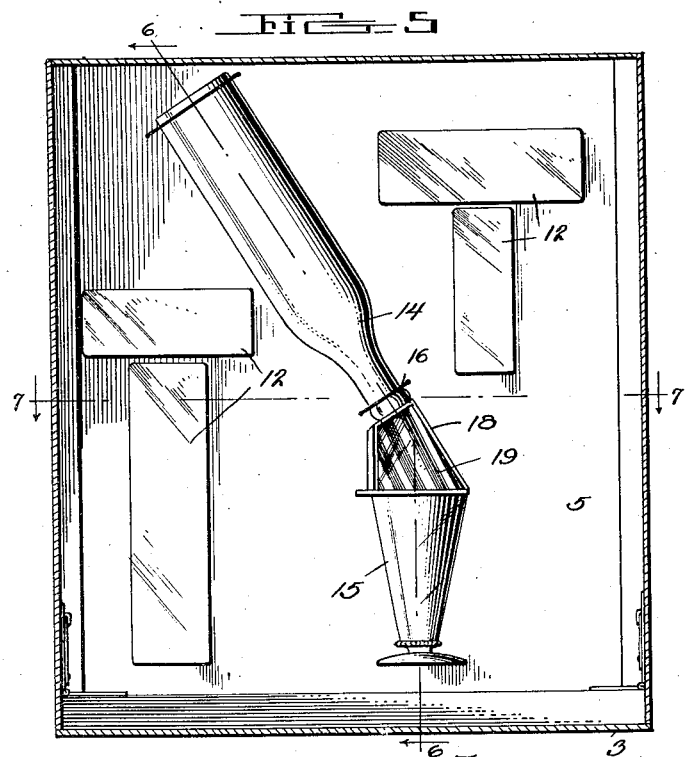
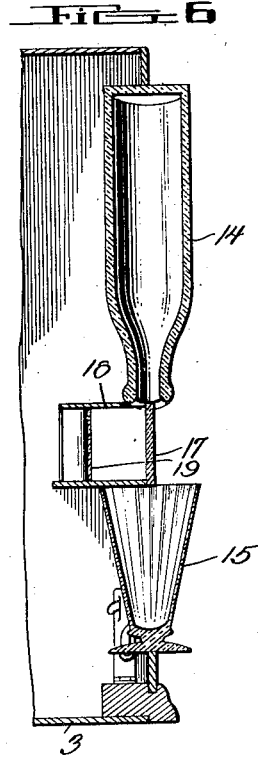
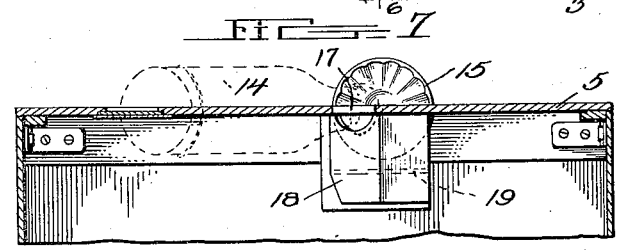
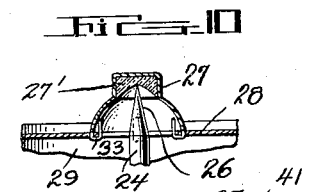
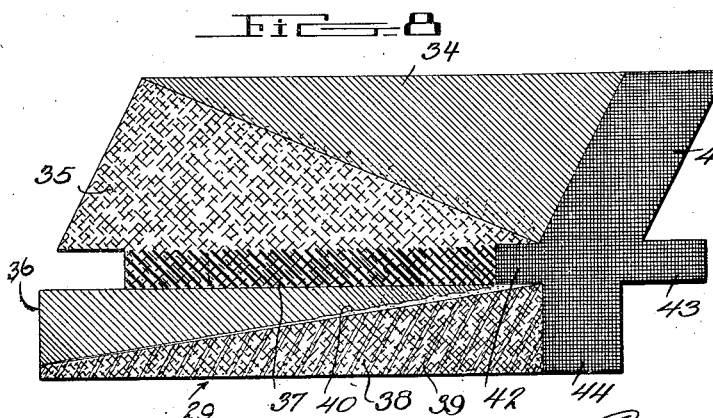
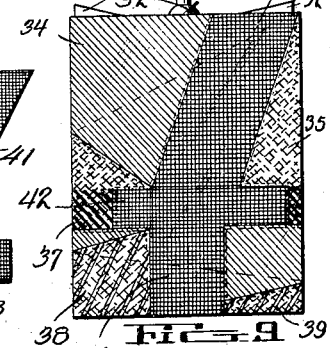
Inventor
Ivan M. Haag Patented Nov. 14, 1933

1,935,557

UNITED STATES PATENT OFFICE 1,935,557

ILLUMINATED DISPLAY DEVICE

Ivan M. Haag, Chicago, Ill., assignor of one-half to Paul E. Blanchard, Chicago, Ill.

Application November 22, 1932
Serial No. 643,920

18 Claims. (Cl. 40—126)

This invention relates to a device for automatically producing repeated illuminated motion effects and a method of producing such effects, in displayed merchandise, or a sign or display apparatus having translucent or transparent areas. More particularly, the invention relates to a device in which a movable color screen or filter having areas of different color moves between a steady source of illumination and an objective in cooperative relationship to produce by a repeatedly changing color filtration of the light rays an animated effect in the objective.

One of the specific objects of the invention is the production of an advertising display device employing means for effecting, by filtration of light on moving illuminated color areas, the appearance of repeated filling and emptying of translucent or transparent receptacles, wherein one receptacle is filled from another in realistic manner indicating characteristics of the material represented and a changing volume of material in the respective receptacles, as the operation proceeds and in which the operation is continuously repeated.

Another object of the invention is the provision of a motor operated display device of the illuminated type which is simple in constructive details, inexpensive to manufacture and which may be easily set up and taken down by a user.

A further object of the invention is the provision of a simple combined heat motor, light filter and illuminating device assembly of novel construction which may be easily packed for shipment and which may be easily and quickly assembled.

Another object is the production of a light filter or screen including transparent areas of different solid colors angularly arranged in adjacent pairs or series in conjunction with other indicating means to simulate the characteristics of and the flow of liquid from one container to another in a continuously repeated manner.

Further objects will become apparent from the detailed description of the invention hereinafter set forth and from the drawings forming part of this specification and showing forms of the invention selected for illustration.

In the accompanying drawings, like reference characters represent like parts throughout the several figures, and Fig. 1 is a perspective view of one form of the invention;

Fig. 2 is a perspective view of the device of Fig. 1, with top and display panel removed to show relation of parts;

Fig. 3 is an exploded view in perspective of the parts of the device unassembled and showing the knockdown characteristics of the housing;

Fig. 4 is a vertical cross sectional view of the device illustrated in Fig. 2;

Fig. 5 is a rear elevation of the display panel;

Fig. 6 is a vertical cross section taken on lines 6—6 of Fig. 5;

Fig. 7 is a cross section taken on the line 7—7 of Fig. 5;

Fig. 8 is a view showing the construction of color light filter forming part of the invention;

Fig. 9 is a front elevation of the color filter cylinder showing arrangement of color areas;

Fig. 10 is a broken sectional view of the light filter cylinder support and bearing;

Fig. 11 is a front elevation of a modified form of display panel and a collapsible box structure;

Fig. 12 is a front elevation of a modified light filter cylinder for use with the panel of Fig. 11; and Fig. 13 is a plan view of the light filter means of Fig. 12, showing the development of the filter.

In the form of the invention illustrated, a housing is provided comprising side walls 1, rear wall 2, bottom 3, top 4 and display panel 5 defining the front wall of the housing. The rear and side walls are hinged at 6 to permit convenient folding of the side walls on the rear wall for storing or shipping purposes. The top is similarly hinged to the display panel for like purposes and adjacent its rear edge is provided with spaced fastening elements 6 for cooperation with hinged hook-latch members 7 on the rear panel to detachably fasten the top in position against stop means 9 on the rear wall of the housing. The bottom 3 is provided with similar latch members for engagement with cooperating elements on the side and rear walls of the housing and is further provided with a slot or groove 10 adjacent its front edge to receive the lower edge of the panel, thus providing a housing structure which may be easily erected or taken apart for packing or storing. Suitable guide elements 11 connected with the bottom of the housing define angularly disposed positioning guides for a lamp and filter support later to be described. The portable type of housing described and selected for illustration represents a practical embodiment of the invention for small display or advertising units, but is not to be taken by way of limitation, for it is within the scope of the invention to apply it to the larger and more permanent type of outdoor advertising and display structures.

The display panel 5 is substantially opaque and is provided with a plurality of spaced transparent or translucent indicating sections for advertising or other matter to be displayed. These indicating sections are illustrated by apertures in the panel which may be covered or filled with translucent or transparent elements 12 varying in color to afford attractive contrast when illuminated from behind the panel and viewed from the front. Two spaced transparent receptacles, a standard bottle 14, and a glass 15 are supported in openings provided in the panel by means engaging the panel and receptacles, such means being indicated as the fine wire 16, and to portray the effect of liquid flowing from the bottle into the glass, a ground glass or equivalent translucent element 17 covers an aperture between the top of the glass and the bottle opening. An opaque shielding hood or light conduit 18 is mounted on the rear of the panel completely surrounding the opening between the receptacles to limit the light rays illuminating this section of the display only to those rays entering the rear of the conduit. A sheet of transparent material 19 having transparent lines of color thereon is disposed transversely of the conduit or hood in spaced relation rearwardly of the ground glass element and acts as a light filter for the rays of light traversing the conduit to the panel to produce a distinct effect in the ground glass section independent of the surrounding illuminated sections of the panel. The glass and bottle supported by the panel act as light refractors, the glass being fluted or ribbed from top to bottom presenting angular sections which, in conjunction with the movable light filter, produce a realistic active effect of liquid such as a carbonated beverage rising in the glass. The glass may be filled with liquid and a piece of crumpled cellophane is employed to indicate ice in the glass.

The invention contemplates illumination of the panel or other form of advertising device from the rear or within the housing. An apertured base support 20 is formed from sheet metal with downwardly bent marginal flanges 21 for positioning engagement in guide elements 11 connected with the bottom of the housing. The base is apertured to support a conventional lamp socket 22 receiving the incandescent lamp 23 for illuminating the device. A vertical metal rod support 24 has one end threaded to provide a detachable connection 25 with the base support and extends upwardly at one side of the lamp to a point above the lamp where it extends inwardly and then upwardly vertically coincident with the axis of the lamp terminating at its upper end in a reduced pointed bearing 26 to receive and rotatably support an anti-friction bearing 27 attached to a heat motor element 28 supporting the rotatable color light filter cylinder 29 which surrounds the lamp with one side thereof interposed between the lamp and the panel.

An opaque curved vertical shield 30 made of non-refracting fireproof material is detachably supported in predetermined position on the lamp base support or on the bottom of the housing within the rotatable light filter and substantially surrounds the lamp, leaving but a relatively small unshielded opening towards the panel for passage of light rays from the source of illumination. The shield insures against reflection of light from the back of the cylinder and against filtration of light rays other than those passing through the front opening in the shield. The extent and particular positioning of the shield is important and defines the area of application of light rays to the cylindrical light filter.

The light filter of the invention is shown in the form of a transparent cylinder 29 supported at its upper end around the periphery of the heat motor disc 28 in any suitable manner so that heat from the lamp cannot escape between the cylinder and the edge of the disc. A suitable means for doing this, in the form of the invention illustrated, is the wire frame 31 soldered or welded to the disc and to which the upper end of the cylinder is affixed. The heat motor disc 28 is of sheet metal with spaced apertures therethrough occasioned by the metal of the disc being cut and adjustably positioned as vanes 32 for propelling the cylinder by upwardly passing air currents from the heat of the lamp, the housing being provided in the rear wall with openings at top and bottom for circulation of air. The supporting anti-friction bearing, including a jewel bearing element 27', is detachably secured in any suitable manner at a central aperture in the disc as by integral fingers 33 passing through holes in the disc and bent back on themselves to afford supporting engagement with the disc. The point bearing of the rod support engages in a recess formed in the jewel bearing element to support the combined heat motor and light filter cylinder above the bottom of the housing to permit free rotation of the cylinder when the lamp is illuminated.

The light filter of the invention is arranged to produce illuminated motion effects by a repeated varying color illumination of the translucent or transparent sections of the panel or other objective with which the filter is used. The filter comprises a plurality of angularly disposed transparent sections and an opaque section of suitable material such as non-inflammable celluloid secured together along their edge portions in a definite order to provide adjacent areas of solid or modified color to form a blank which may be rolled to form the filter cylinder.

The developed form of light filter is illustrated in Figs. 8 and 9 of the drawings and is intended to be passed between the light source and the panel from right to left to produce a continuously repeated illuminated motion effect in the panel. In the particular filter shown, 34 is green in color and 35 is amber, with the area adjacent its lower edge provided with a plurality of angularly disposed transparent color areas painted thereon. The members 34 and 35 are substantially triangular in form and are joined together to provide substantially a parallelogram with the junction line of the two elements forming a diagonal thereacross. The lower part of the filter structure comprises the green element 36 and the amber element 38 which are similarly joined at side edges to produce a junction line forming a diagonal across the rectangle which, if projected, would intersect the diagonal of the parallelogram formed by the members 34 and 35. At the junction of the members 36 and 38, there is provided an interposed narrow transparent area 40, increasing in width toward one end of the assembled elements of the lower part of the filter. The members 36 and 38 constitute a lower pair of different colored transparent elements, and this pair of elements is affixed to the lower edge portion of the upper pair of filter elements 34 and 35 to define a series of pairs of transparent filter elements of differing colors. An opaque section 41 has its edges connected with the color filter section and comprises a lower section for cooperation with the lower filter color pair and an angular section for cooperation with the upper color pair of the filter. Lateral projections 42 and 43 of the opaque section are secured to the color section of the filter at oppositely disposed openings in the edges of the color filter section. The lower orange element of the lower filter color pair is preferably provided with a diagonal series of transparent color areas 39 painted thereon. The filter development thus described involves a structure which is to be repeatedly passed across the display panel between the light source and the objectives, one series only being shown in view of the production of the result by a rotating cylinder. The filter may be fabricated in a flat composite color member as shown in Fig. 8, and may be subsequently rolled and formed into the rotating cylinder by simply joining the free edge of color areas with the free edge of the opaque section.

In operation, the completed filter cylinder of Fig. 9 is rotated behind the panel and the upper color members 34, 35 are positioned behind the bottle, with the lower area of the member 35 having the oblique color lines painted thereon disposed in back of the light conduit 18. The lower pair of color elements 36 and 38 are positioned behind the glass 15. With the bottle and glass positioned behind the opaque section, rotation of the cylinder from right to left, under the influence of heat from the lamp 23, will first render the bottle illuminated in color by light rays passing through the filter element 35, and the glass illuminated in color by light rays passing through the element 36. As the cylinder continues to rotate, the green color area 34 and the orange color area 38 will progressively move across the bottle and glass, respectively, defining by their diagonal juncture with the color areas 35 and 36, a continuously diminishing volume of liquid in the bottle and a constantly rising volume of liquid in the glass. During the movement of the cylinder, the lower portion of the color element 35 with the oblique color areas thereon, passes behind the conduit 18 and cooperates with the fixed filter section 19 in the conduit to produce in the opening between the bottle and glass, the effect of liquid moving from the bottle to the glass. The area 40 between lower pair of color areas follows the level of rising liquid in the glass and indicates, in conjunction with small spots of transparent material along the junction line of the elements, foam and bubbles on the liquid. Suitable transparent specks or spots are utilized along the lower edge of the color area 34 to portray bubbles in the bottle. As the cylinder continues to rotate, the color illumination of the bottle changes from orange to green and that of the glass from green to orange, until the bottle is empty and the glass is full, when the opaque sections reverse the arrangement for repeated operation. The glass 15 being fluted or ribbed from bottom to top, the optical illusion of bubbles rising in the glass is obtained by the cooperation of the color areas 36, 38, 39 and 40. It is apparent that the filter series of Fig. 8 may be repeated in the development of a band type filter and the colors utilized for purposes of description of the invention may be varied in accordance with the effect to be produced. The filter produces oppositely moving areas of color illumination in the bottle and glass and indicates, in a reverse manner in the receptacle, changing volume of material.

In the modified form of device shown in Figs. 11 to 13, the housing comprises a collapsible fireproof structure 45 provided with a panel section 46 substantially like that described above, except that there is no connection shown between the bottle and the glass. The color filter cylinder particularly illustrated in Fig. 13, shows the parallelogram pair of green and orange filter members 47 and 48 attached at their lower edge to the rectangular pair of green and orange filter members 49 and 50. The development of the filter series so formed is shaped into cylindrical form as shown in Fig. 12 in like manner to the preferred form of invention described above. There being no connection in the modified form of structure which is designed for small indoor or counter of cheap manufacture, the flow of liquid between the bottle and the receptacle is not portrayed. It will be noted in the development of the filter of Fig. 3 that the rotation of the cylinder will be in the opposite direction to that shown in Fig. 9, and the vanes of the heat motor element 28 will be reversed. In setting up the modified form of device shown in Figs. 11 to 13, the housing 45 in its collapsed form is opened to provide for insertion of the illuminating means and color filter behind the panel in adjusted position.

While a preferred embodiment of the invention has been selected for illustration, modified forms will be apparent to those skilled in the art and the invention is limited only by the scope of the claims.

I claim:

1. In an illuminated display device, the combination with an opaque panel having translucent or transparent vertically spaced receptacles outlined therein for illumination from the rear of the panel, a source of light behind the panel, and means passing horizontally across the panel between the light source and the panel with progressively changing areas of different color illumination for producing colored illumination of the receptacles to indicate continuously repeated flow of material from one receptacle to another.

2. In an illuminated display device, the combination with an opaque panel having translucent or transparent vertically spaced receptacles outlined therein for illumination from the rear of the panel, a source of light behind the panel, and means passing horizontally across the panel between the light source and the panel with progressively changing areas of different color illumination for producing colored illumination of the receptacles to indicate continuously repeated flow of material from one receptacle to another, and said means including upper and lower pairs of alternate colored transparent members.

3. In an illuminated display device, the combination with an opaque panel having translucent or transparent vertically spaced receptacles outlined therein for illumination from the rear of the panel, a source of light behind the panel, and means passing horizontally across the panel between the light source and the panel with progressively changing areas of different color illumination for producing colored illumination of the receptacles to indicate continuously repeated flow of material from one receptacle to another, said means including a rotating transparent light filter cylinder having a series of pairs of different colored areas substantially triangular in form and joined along diagonal lines to indicate changing volumes of material in the receptacles.

4. A display device of the character described comprising, an opaque panel with spaced translucent or transparent indicating sections, a source of light at the rear of the panel, a movable light filter between the light source and the panel, said filter including a reversely arranged series of different color areas substantially triangular in form adapted to pass across the indicating sections to simultaneously illuminate the spaced indicating sections with different color illumination moving in opposite directions.

5. A display device comprising, an apertured panel, translucent or transparent receptacles supported by the panel, a source of light at the rear of the panel, a movable light filter between the light source and panel, said filter including horizontal reversely arranged series of transparent solid color areas for passing across the receptacles, and means for supporting and moving the filter.

6. A display device comprising, a panel, apertured to indicate an upright and an inverted receptacle, a source of light for illuminating the panel, a movable light filter between the light source and panel, said light filter including reversely arranged pairs of transparent solid color portions of progressively varying areas adapted to pass across the receptacle openings in the panel to indicate in constantly repeated manner the filling of one receptacle from the other, and means for continuously moving the filter.

7. A display device comprising an opaque panel with translucent or transparent sections indicating receptacles for illumination, illuminating means for continuously supplying light rays for illuminating said sections, and means for continuously filtering the light rays supplied to the sections with varying color areas to produce changing solid color lines traversing the illuminated sections indicating inversely changing volumes of material in the receptacles, said filtering means surrounding the illuminating means for actuation thereby.

8. A display device comprising, an opaque panel having a plurality of apertures for illumination, transparent or translucent means indicating receptacles supported by the panel in at least two of the apertures, a source of illumination continuously supplying light rays for illuminating the apertures and the receptacle indicating means, and horizontally movable means for color filtering the light from the source of illumination to the panel, said filtering means including solid color areas substantially triangular in form effecting solid color lines traversing the receptacle indicating means whereby to indicate by changing areas of color illumination changing volumes of material in the respective receptacles.

9. The method of producing illuminated motion effects of emptying one and filling another translucent or transparent container which comprises, applying to the containers a continuous flow of light rays from a suitable source of illumination, and color filtering the rays passing to the containers by changing solid color areas to produce the effect of changing volumes of material in the receptacles.

10. The method of producing illuminated motion effects of emptying and filling translucent or transparent containers which comprises, applying to the containers a continuous flow of light rays from a suitable source of illumination, and changeably filtering by color the continuous flow of light rays applied to the containers to produce the effect of simultaneously filling one container from another in a continuously repeated sequence.

11. The method of producing repeated illuminated motion effects of emptying and filling translucent or transparent receptacles which comprises applying light rays to the receptacles from a suitable source of illumination, and color filtering the light rays passing to the receptacles with a pair of movable transparent strips, having increasing and decreasing color areas respectively to effect the illusion of decreasing the volume of material in one receptacle while simultaneously increasing the volume of material in another receptacle.

12. An advertising display device comprising, a housing, a display panel for the housing having translucent or transparent areas outlined thereon for illumination from the rear of the panel, illuminating means within the housing, and means including movable transparent strips having increasing and decreasing color areas respectively producing changing areas of colored illumination in adjacent areas outlined in the panel, the different areas of color illumination changing in opposite directions in adjacent panel areas and at right angles to the movement of the strips.

13. An advertising display device comprising, a housing, a display panel for the housing having translucent or transparent areas outlined thereon for illumination from the rear of the panel, illuminating means within the housing, means including a series of pairs of movable transparent strips having increasing and decreasing color areas and an opaque area producing changing areas of colored illumination in adjacent areas outlined in the panel, the different areas of color illumination changing in opposite directions across adjacent panel areas and at right angles to the movement of the strips.

14. In an illuminated display device including an opaque panel having vertically spaced translucent or transparent receptacles outlined therein, a source of light, and a movable color filter having an upper part in the shape of a parallelogram formed by two substantially triangular sections of different colors, and a lower part in the form of a parallelogram formed by two substantially triangular sections of the same different colors of the upper sections, with the triangles of the different colors in the lower part arranged in a reversed relationship to the corresponding triangles of different colors on the upper part to simulate the emptying of fluid from the upper receptacle and the filling of the lower receptacle with the fluid.

15. In an illuminated display device including an opaque panel having vertically spaced translucent or transparent receptacles outlined therein, a source of light, and a movable color filter having an upper part in the shape of a parallelogram formed by two substantially triangular sections of different colors to simulate the emptying of the upper receptacle, and a lower part in the form of a parallelogram formed by two substantially triangular sections of the same different colors as the upper sections but with the triangles of different colors arranged in a reversed relationship to the corresponding triangles on the upper part to simulate the filling of the lower receptacle, and a narrow strip between the triangular sections on the lower part to simulate an agitation of the top of the liquid as its level rises in the lower receptacle.

16. In an illuminated display device, the combination with an opaque panel having translucent or transparent vertically spaced receptacles outlined therein for illumination from the rear of the panel, a source of light behind the panel, and means passing horizontally across the panel between the light source and the panel with progressively changing areas of different color illumination for producing colored illumination of the receptacles to indicate continuously repeated flow of material from one receptacle to another, said means including an upper and a lower pair of alternately colored transparent members with a narrow band between the lower pair of colors for simulating agitated fluid at the liquid level in the lower receptacle.

17. A color light ray filter for movement between a source of illumination and an apertured display panel comprising an upper portion formed by two substantially triangular transparent sections of different colors, a lower portion formed by substantially triangular transparent sections of the same different colors as the upper portion arranged in reversed relationship to the corresponding triangles of the upper portion, and an opaque strip extending across ends of the upper and lower portions.

18. A color light ray filter for movement between a source of illumination and a display panel comprising a band having an upper portion formed of substantially triangular transparent sections of different colors, a lower portion formed by substantially triangular transparent sections of the same different colors as the upper portion with a narrow tapering strip between lower portion sections, the lower sections arranged in reversed relationship to the corresponding triangles of the upper portion, a partially colored strip joining upper and lower portions, and an opaque strip between side edges of the filter portions.

IVAN M. HAAG.